United States Patent [19]

Hattori et al.

[11] 4,207,847
[45] Jun. 17, 1980

[54] ELECTRONIC IGNITION CONTROL APPARATUS

[75] Inventors: Tadashi Hattori, Okazaki; Mamoru Kobashi, Aichi; Tooro Kawase, Toyota; Yoshiki Ueno, Okazaki, all of Japan

[73] Assignees: Nippon Soken, Inc., Nishio; Toyota Jidosha Kogyo Kabushiki Kaisha, Toyota, both of Japan

[21] Appl. No.: 902,966

[22] Filed: May 4, 1978

[30] Foreign Application Priority Data

May 11, 1977 [JP] Japan .................................. 52-53913
May 31, 1977 [JP] Japan .................................. 52-64069

[51] Int. Cl.² .............................................. F02P 5/04
[52] U.S. Cl. ............................ 123/117 R; 123/117 D
[58] Field of Search ....................... 123/117 R, 117 D

[56] References Cited

U.S. PATENT DOCUMENTS

| | | | |
|---|---|---|---|
| 3,927,648 | 12/1975 | Kawai et al. .................... | 123/117 D |
| 4,015,565 | 4/1977 | Rono et al. ...................... | 123/117 D |
| 4,015,566 | 4/1977 | Wahl ................................ | 123/117 R |
| 4,052,967 | 10/1977 | Colling et al. .................... | 123/117 D |
| 4,127,091 | 11/1978 | Letchla ............................. | 123/117 R |
| 4,131,097 | 12/1978 | Sawada et al. .................... | 123/117 D |

FOREIGN PATENT DOCUMENTS 1470517  4/1977  United Kingdom ................ 123/117 D Primary Examiner—Charles J. Myhre
Assistant Examiner—Raymond A. Nelli
Attorney, Agent, or Firm—Cushman, Darby & Cushman

[57] ABSTRACT

In an electronic ignition control apparatus for an engine, an actual optimum spark advance angle for activation of a spark plug is determined as a value defined by a linear equation representing a relationship between an optimum spark advance angle and an amount of air sucked into the engine in consideration with an actual rotation speed by using a stored optimum spark advance angle defined by a reference linear equation representing a relationship between the stored optimum spark advance angle and an amount of the sucked air in consideration with a predetermined rotation speed.

7 Claims, 11 Drawing Figures

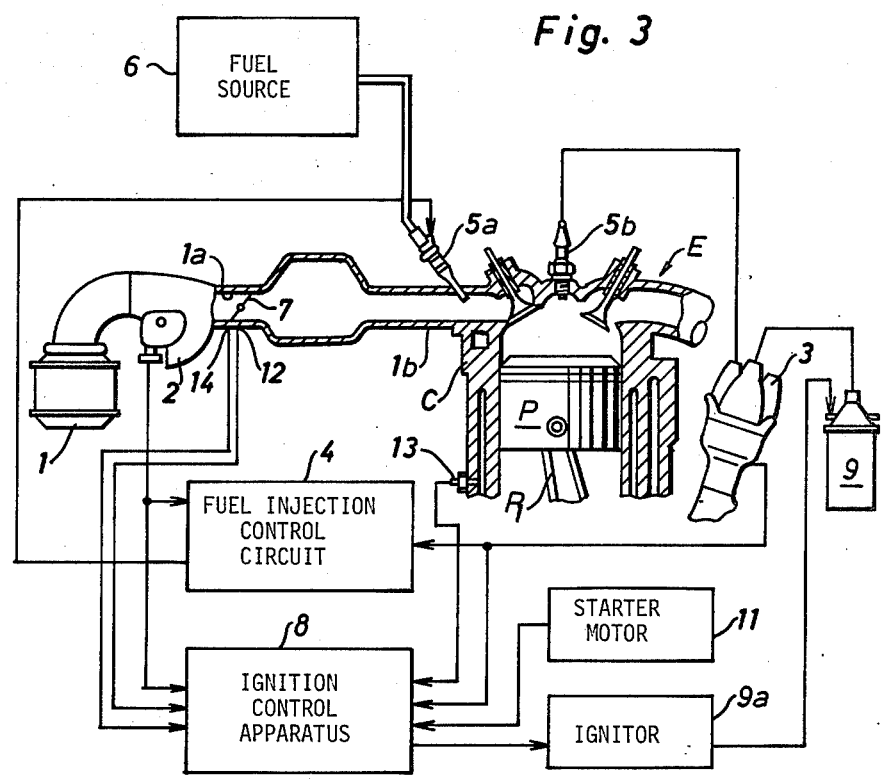
Fig. 3
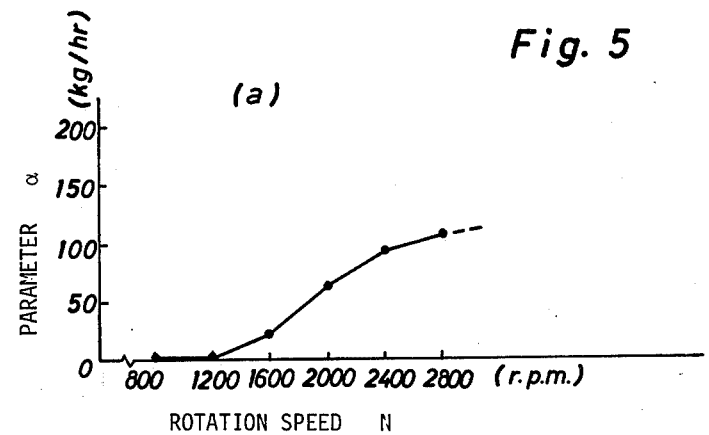
Fig. 5 (a)
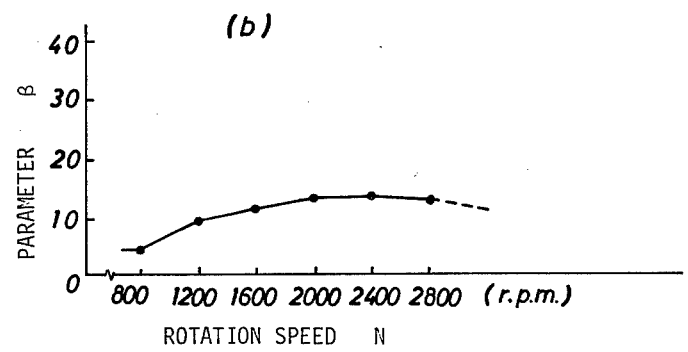
(b)

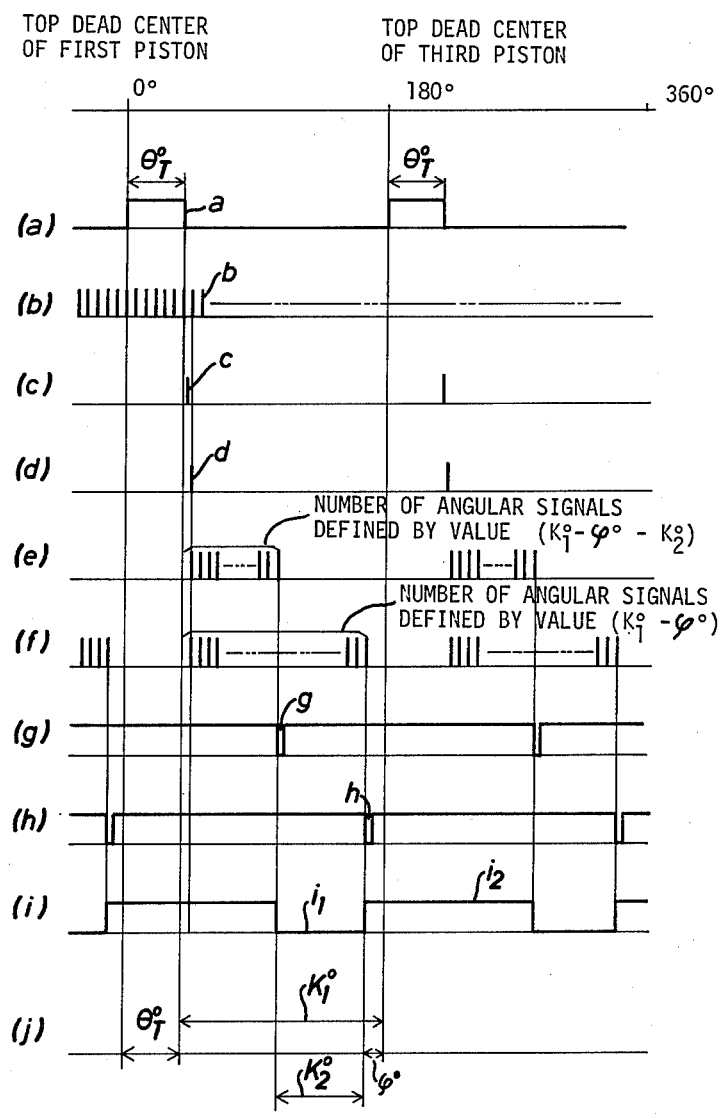

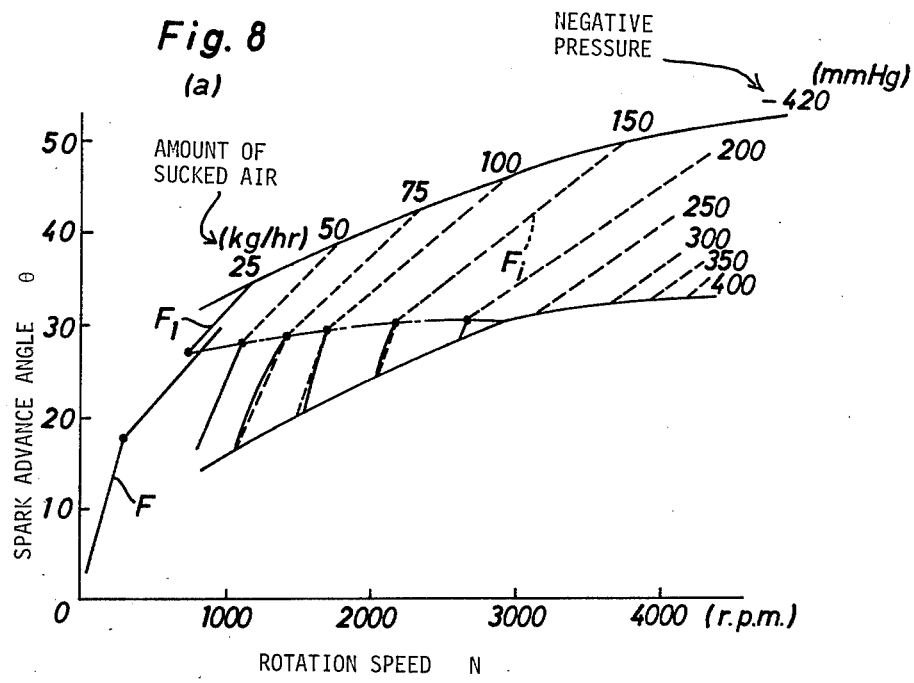
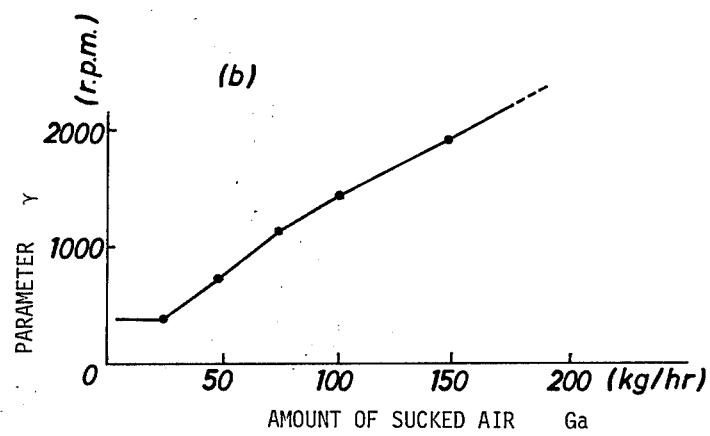
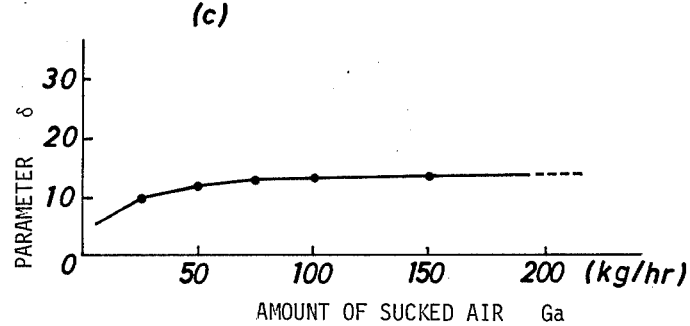

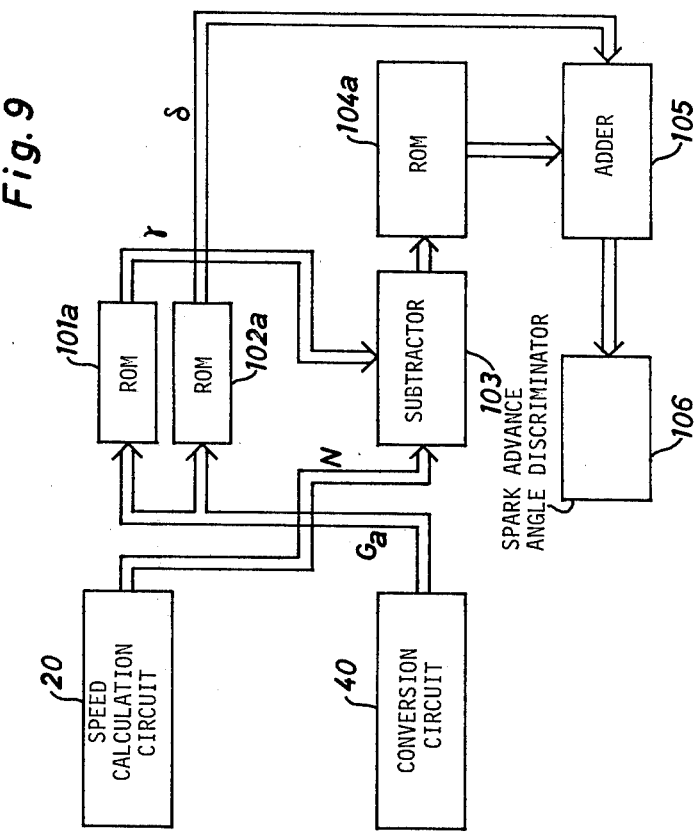

ELECTRONIC IGNITION CONTROL APPARATUS

BACKGROUND OF THE INVENTION

The present invention relates to an electronic control apparatus for internal combustion engines, and more particularly to an electronic ignition control apparatus to determine an optimum timing of sparks supplied to the engine in accordance with changes of operating condition of the engine.

SUMMARY OF THE INVENTION

The primary object of the present invention is to provide an electronic ignition control apparatus wherein an actual optimum spark advance angle for activation of each spark plug is determined as a value defined by a linear equation representing a relationship between the optimum spark advance angle and the amount of air intake in consideration with the actual rotation speed by using a stored optimum spark advance angle defined by a reference linear equation representing a relationship between the stored optimum spark advance angle and the amount of air intake in consideration with a predetermined rotation speed.

According to the present invention, there is provided an electronic ignition control apparatus for an internal combustion engine having an output shaft rotated by a piston, an ignition coil adapted to generate a spark voltage upon deenergization of the primary winding thereof, and a spark plug activated by the spark voltage to ignite the air-fuel mixture metered into a combustion chamber of the engine so as to operate the piston, the control apparatus comprising:

a first signal generator for producing a first binary signal indicative of rotation speed N of the output shaft;

a second signal generator for producing a second binary signal indicative of an amount of air sucked into the combustion chamber of the engine;

first memory means for storing a parameter $\alpha$ in relation to rotation speed N of the output shaft to produce a third binary signal indicative of a value of the parameter $\alpha$ in accordance with the first binary signal, the parameter $\alpha$ indicating a difference between the amount of air intake at the actual engine rotation speed required for any particular optimal spark advance angle, and an amount of air intake at a predetermined engine rotation speed required for the same optimal spark advance angle;

a calculation circuit for calculating a value from values defined by the second and third binary signals and for producing a fourth binary signal indicative of the calculated value;

second memory means for storing the optimum spark advance angle satisfying a linear equation and for producing a fifth binary signal indicative of the optimum spark advance angle in accordance with a compensated value;

a timing signal generator for generating a timing signal in accordance with the fifth binary signal; and means for deenergizing the primary winding of the ignition coil in response to the timing signal.

For the actual practice of the present invention, at the first stage of experimentation conducted by the inventors, a relationship between an optimum spark advance angle and the amount of air intake of an engine in consideration with negative pressure in the air suction passage of the engine was obtained as shown by each of characterisic curves in FIG. 1. At the second stage, based on the above-noted relationship, the inventors obtained the following linear equation representing a relationship between the optimum spark advance angle and the amount of air intake in consideration with rotation speed of the engine, as shown by each of straight lines A and $A_i (i=1, 2, ...)$ in FIG. 1: $\theta = f(Ga)$ where $\theta$ indicates an optimum spark advance angle, and Ga indicates an amount of air intake. From the linear equation, the inventors obtained another linear equation representing a relationship between the optimum spark advance angle and the amount of air intake in consideration with rotation speed of the engine and conditions causing detonation in the engine, as shown by each of straight lines B and $B_i(i=1, 2, ...)$ in FIG. 2. The straight lines B and $B_i$ are respectively intersected with the straight lines A and $A_i$ at intersections D and $D_i$ to form polygonal lines C and $C_i$.

In a mutual relationship between the straight lines A and $A_i(i=1, 2, ...)$ of FIG. 1, it has been recognized by the inventors that an optimum spark advance angle determined on the basis of the respective lines A and $A_i$ may be determined on the basis of one of the straight lines A and $A_i$. For example, assuming that a linear equation $\theta = f(Ga - \alpha)$ defined by the straight line A in FIG. 1 is selected as a basic one, an optimum spark advance angle defined by a linear equation $\theta = f(Ga)$ at a rotation speed of 1200 r.p.m. can be obtained from the linear equation $\theta = f(Ga - \alpha)$ in consideration with only the interval $\alpha$ along the axis of abscissas or ordinates between the straight lines A and $A_1$ because the straight lines A and $A_1$ are nearly parallel to each other. To obtain an optimum spark advance angle at a rotation speed of 2000 r.p.m., a ratio $R_a$ between the slope of the straight line A and the slope of the straight line $A_3$ should be considered in addition to an interval $R_b$ along the axis of the abscissas or ordinates between the straight lines A and $A_3$, because the straight line $A_3$ is not in parallel with the straight line A.

Furthermore, it has been recognized by the inventors that an optimum spark advance angle to be determined based on the respective polygonal lines C and $C_i$ in FIG. 2 may be determined based on one of the polygonal lines C and $C_i$. Assuming that the polygonal line C is selected as a basic one, an optimum spark advance angle at a rotation speed of 1200 r.p.m. can be determined based on the polygonal line C in the similar method as that described above. In this case, to determine an optimum spark advance angle at a rotation speed of 1200 r.p.m. in a range between intersections D and $D_1$ on the polygonal lines C and $C_1$, a value or spark advance angle to be compensated along the axis of ordinates should be also considered because the straight line $B_1$ of the polygonal line $C_1$ is different from the straight line B of the polygonal line C in the ascent.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a schematic block diagram of an electronic control system for the engine including an electronic ignition control apparatus in accordance with the present invention;

FIG. 5 depicts graphs respectively indicative of parameters $\alpha$ and $\beta$ in relation to rotation speed N;

FIG. 6 illustrates waveforms obtained at various points in the ignition control apparatus of FIG. 4;

FIG. 8(a) depicts a graph indicative of an optimum spark advance angle $\theta$ in relation to rotation speed N in consideration with engine detonation;

FIGS. 8(b) and 8(c) depict graphs respectively indicative of parameters Y and $\delta$ in relation to an amount Ga of the air intake;

FIG. 9 illustrates a modified portion of the circuit diagram of the ignition control apparatus shown in FIG. 4;

DESCRIPTION OF THE PREFERRED EMBODIMENTS

Figure 1:
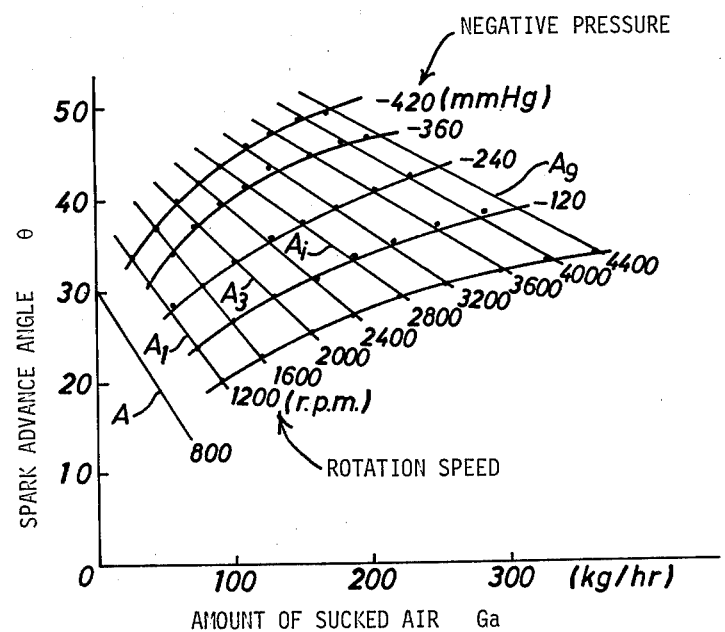
FIG. 1 depicts a graph indicative of an optimum spark advance angle $\theta$ in relation to an amount Ga of air intake of an internal combustion engine.

Referring now to the accompanying drawings, in particular to FIG. 3 there is illustrated a schematic block diagram of an electronic control system for an internal combustion engine E including an electronic ignition control apparatus 8 in accordance with the present invention.

The engine E is of a conventional four cylinder, four stroke type and comprises a piston P reciprocable within each cylinder C. The piston P is connected by way of a connecting rod $P_1$ to a crankshaft (not shown) to rotate the crankshaft in response to reciprocation thereof. The engine E also comprises four fuel injectors 5a mounted on an intake manifold 1b and four spark plugs 5b mounted on a cylinder head. Each fuel injector 5a is activated by receiving each electric signal from a fuel injection control circuit 4 to supply fuel from a fuel source 6 into the cylinder C. Each spark plug 5b is energized by a spark voltage from a distributor 3 to produce a spark for igniting air-fuel mixture within the cylinder 3. The distributor 3 is provided to distribute the spark voltage from an ignition coil 9 to each spark plug 5b at appropriate intervals.

The electronic control system comprises an air flow meter 2 provided within an induction passage 1a and a signal generator 10 (See FIG. 4) provided within the distributor 3. The air flow meter 2 detects an amount of air intake of the engine E from an air cleaner 1 through the induction passage 1a and a throttle valve 7 to produce an electric signal indicative of the amount of air intake. The signal generator 10 includes a reference signal generator 10a for producing four reference signals a with an angular width $\theta_T°$ per two rotations of the crankshaft (See FIG. 6). The signal generator 10 also includes a speed signal generator 10b for producing 720 angular signals b per two rotations of the crankshaft. Each reference signal a is generated upon the arrival of each piston C to its top dead center position, and each angular signal b is generated at a one-degree rotation of the crankshaft.

The electronic control system further comprises first and second throttle switches 12 and 14 provided with the throttle valve 7 and a crank switch (not shown) provided within a starter motor 11 operatively coupled with the crankshaft. The first throttle switch 12 closes only at fully closed position of the throttle valve 7, and the second throttle switch 14 closes only at fully opened position of the throttle valve 7. The crank switch is to be closed only under cranking operation of the engine E. A coolant temperature sensor 13 is provided in the engine cooling system to detect coolant temperature of the engine E. The fuel injection control circuit 4 receives electric signals from the air flow meter 2, the signal generator 10 and other sensors (not shown) to optimally control the amount of fuel injected from the fuel injector 5a. The ignition control apparatus 8 receives the electric signals from the air flow meter 2 and the signal generator 10 to generate an optimum ignition timing signal under control by the throttle switches 12 and 14, the crank switch and the coolant temperature sensor 13. An ignitor 9a receives the ignition timing signal from the ignition control apparatus 8 to produce the spark voltage in the ignition coil 9.

Figure 4:
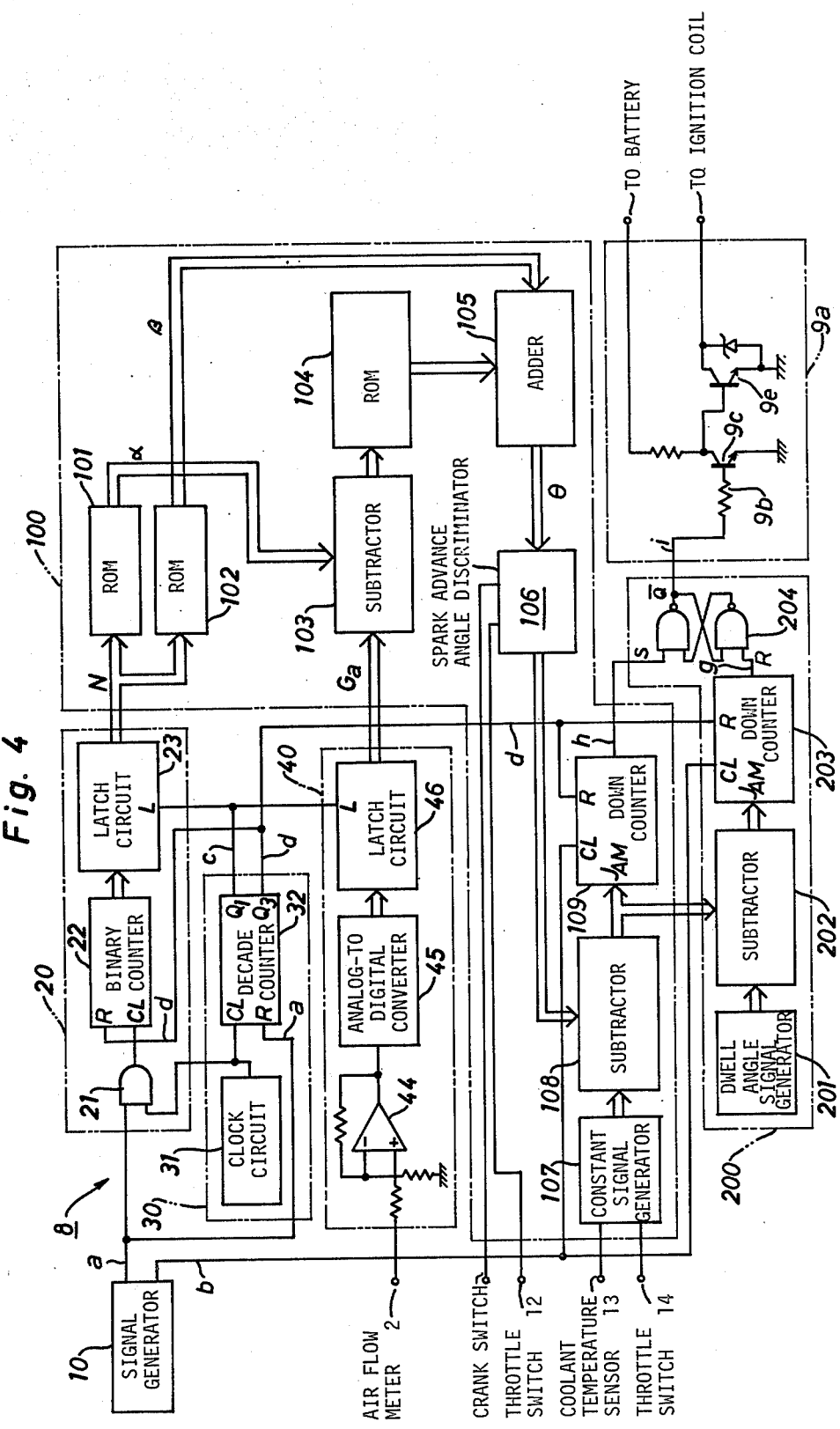
FIG. 4 is a circuit diagram of an embodiment of the ignition control apparatus illustrated in block form in FIG. 3.

In FIG. 4 illustrates an embodiment of the ignition control apparatus 8 which is described hereinafter in detail. The ignition control apparatus 8 comprises a speed calculation circuit 20 driven by a timing circuit 30 in response to each reference signal a from the signal generator 10. The timing circuit 30 comprises a decade counter 32 to be reset by each reference signal a. The counter 32 counts clock pulses from a clock circuit 31 immediately after release of the reset condition thereof to generator at its output terminals $Q_1$ and $Q_3$ latch and reset signals c and d shown in FIG. 6. The latch and reset signals c and d appear sequentially within a period of time of the angular signal b immediately after a waveform of each reference signal a drops at its trailing edge.

The speed calculation circuit 20 includes a binary counter 22 for counting output pulses from an AND gate 21. AND gate 21 receives clock pulses from the clock circuit 31 in response to each reference signal a to generate therefrom the output pulses corresponding with the angular width $\theta_T°$ of each reference signal a. The binary counter 22 is reset upon receiving each reset signal d from the decade counter 32 to count the output pulses from AND gate 21 in response to a reference signal a following to each reset signal d. Then, the counter 22 generates a binary electric signal defined by the angular width $\theta_T°$ after completion of its count. In other words, the counter 22 generates the binary electric signal indicative of an instant rotation speed N at a half crankshaft rotation. A latch circuit 23 is provided to latch the binary electric signal from the counter 22 in response to each latch signal c.

In operation of the speed calculation circuit 20 relative to the timing circuit 30, assuming that the signal generator 10 generates a reference signal a therefrom, the reference signal a is applied to AND gate 21 and the decade counter 32. When AND gate 21 receives clock pulses from the clock circuit 31 in response to the reference signal a, output pulses are generated from AND gate 21 and applied to the counter 22. Simultaneously, the counter 32 is reset by the reference signal a to count clock pulses from the clock circuit 31 immediately after release of the reset condition thereof so as to sequentially generate latch and reset signals c and d therefrom. The latch signal c is applied to the latch circuit 23, and the reset signal d is applied to the counter 22. Then, a binary signal, which is previously produced from the counter 22 in response to a reset signal d prior to the above latch signal c, is latched and transferred by the latch circuit 23 to a first calculation circuit 100. Subsequently, the counter 22 is reset by the reset signal d to count the output pulses from AND gate 21 so as to generate another binary signal therefrom upon completion of its count.

The ignition control apparatus 8 further comprises a conversion circuit 40 for converting the electric signal from the air flow meter 2 into a binary electric signal indicative of an amount Ga of air intake. The conversion circuit 40 includes a differential amplifier 44 for amplifying the electric signal from the air flow meter 2 and an analog-to-digital converter 45 for converting an output signal from the amplifier 44 into the binary electric signal indicative of an amount Ga of the sucked air. In the conversion circuit 40, a latch circuit 46 is provided to latch and transfer the binary electric signal from the converter 45 to the first calculation circuit 100 in response to each latch signal c from the decade counter 32.

Figure 2:
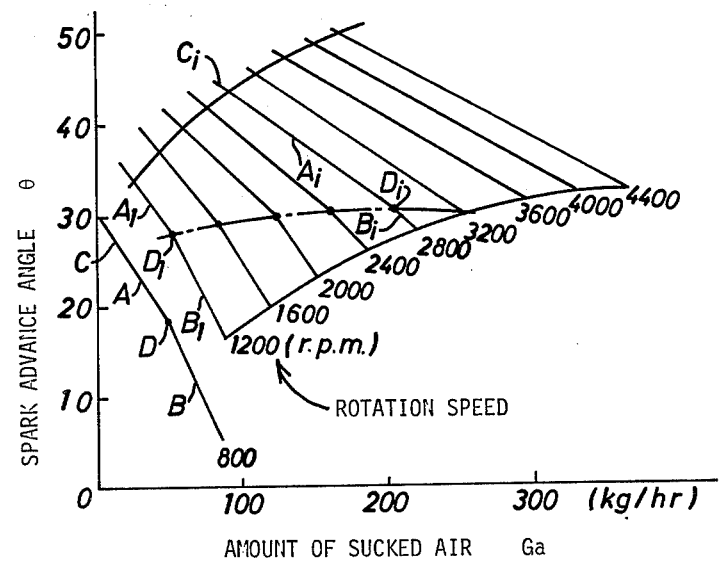
FIG. 2 depicts a graph indicative of an optimum spark advance angle $\theta$ in relation to an amount Ga of the air intake in consideration with engine detonation.

The first calculation circuit 100 comprises read only memories or ROMS 101 and 102 for receiving the binary electric signal indicative of an instant rotation speed N from the latch circuit 23. ROM 101 previously stores therein data indicating a parameter $\alpha$ in relation to the rotation speed N in (a) of FIG. 5, the parameter $\alpha$ indicating an interval along the axis of abscissas between the polygonal lines C and $C_i(i=1, 2, \ldots)$ in FIG. 2. ROM 102 previously stores therein data indicating a parameter $\beta$ in relation to the rotation speed N in (b) of FIG. 5, the parameter $\beta$ indicating a value to be compensated along the axis of ordinates between the polygonal lines C and $C_i(i=1, 2, \ldots)$ in FIG. 2. With ROM 101, an instant value of $\alpha$ is read out as a binary signal in relation to the instant rotation speed N defined by the binary signal from the latch circuit 23 by using the stored data. Meanwhile, with ROM 102, an instant value of $\beta$ is read out as a binary signal in relation to the instant rotation speed N by using another stored data.

The first calculation circuit 100 further comprises a subtractor 103 for receiving the binary signal indicative of the instant value of $\alpha$ from ROM 101 and the binary signal indicative of an instant amount Ga of the air intake from the latch circuit 46. The instant value of $\alpha$ is subtracted in the subtractor 103 from the instant amount Ga of intake, and a subtracted resultant value $(Ga - \alpha)$ is applied as a binary signal to a read only memory or ROM 104. ROM 104 is provided to previously store therein a first reference data defined by the polygonal line C which indicates an optimum spark advance angle in relation to the amount of air intake at a predetermined rotation speed of 800 r.p.m. in FIG. 2. With ROM 104, a spark advance angle is read out in relation to the subtracted value $(Ga - \alpha)$ defined by the binary signal from the subtractor 103 by using the stored data, and a read out value or spark advance angle is applied as a binary signal to the adder 105. The adder 105 adds the read out value from ROM 104 to the value of $\beta$ defined by the binary signal from ROM 102. An added resultant value from the adder 105 is applied to a spark advance angle discriminator 106 as a binary signal indicative of an optimum spark advance angle $\theta°$ in relation to the instant rotation speed and the amount of the sucked air respectively defined by the binary signals from the latch circuits 23 and 46.

The discriminator 106 is designed to transfer the binary signal indicative of the added resultant value $\theta°$ to a subtractor 108 only when the crank switch and the first throttle switch 12 are opened. When the crank switch and the first throttle switch 12 are closed under cranking of the engine E, the discriminator 106 generates a binary signal indicative of a first predetermined optimum spark advance angle $\theta_1°$ therefrom. When the crank switch is opened and the first throttle switch 12 is closed during idle operation of the engine E, the discriminator 106 generates a binary signal indicative of a second predetermined optimum spark advance angle $\theta_2°$. The spark advance angles $\theta_1°$ and $\theta_2°$ are experimentally determined to ensure an optimum ignition timing of the engine E under cranking and idling operations respectively.

When one of the binary signals respectively indicative of the spark advance angles $\theta_1°$, $\theta_2°$ and $\theta°$ is transferred to the subtractor 108 from the discriminator 106, one of the advance angles $\theta_1°$, $\theta_2°$ and $\theta°$ is subtracted from a constant $K_1°$ (see FIG. 6) defined by a binary signal from a constant signal generator 107, the character $\theta_1°$, $\theta_2°$ or $\theta°$ being represented by a character $\phi°$ in the following description. The constant signal generator 107 produces the binary signal indicative of the constant $K_1°$ in accordance with operating conditions of the engine E under control by the coolant temperature sensor 13 and the second throttle switch 14. In this case, the constant $K_1°$ corresponds with a difference between 180° and $\theta_T°$ defined by the reference signal a, as shown in FIG. 6. A down counter 109 is provided to receive the angular signals b from the signal generator 10 and a binary signal indicative of the subtracted value $(K_1° - \phi°)$ from the subtractor 108. The down counter 109 is reset upon receiving the reset signal d from the decade counter 32 to count down a predetermined number of the angular signals b (See FIG. 6) corresponding with the value $(K_1° - \phi°)$ to zero. Thus, the counter 109 generates an output signal h therefrom upon completion of its count. The output signal h is applied to a flip-flop 204 of a second calculation circuit 200.

The second calculation circuit 200 comprises a dwell angle signal generator 201 for generating a binary signal indicative of a predetermined dwell angle $K_2°$ (See FIG. 6) and a subtractor 202 for receiving the binary signals from the signal generator 201 and the subtractor 108. In this subtractor 202, the predetermined dwell angle $K_2°$ is subtracted from the value $(K_1° - \phi°)$ defined by the binary signal of the subtractor 108. A down counter 203 is provided to receive a binary signal indicative of a subtracted resultant value $(K_1° - \phi° - K_2°)$ from the subtractor 202 and the angular signals b from the signal generator 10. The down counter 203 is reset upon receiving the reset signal d from the counter 32 to count down a predetermined number of the angular signals b (See FIG. 6) corresponding with the value $(K_1° - \phi° - K_2°)$ to zero. Thus, the counter 203 generates therefrom an output signal g upon completion of its count.

The flip-flop 204 receives at its input terminal R the output signal g from the down counter 203 to generate a low level signal $i_1$ at its output terminal $\overline{Q}$, the low level signal $i_1$ having a width corresponding with the predetermined dwell angle $K_2°$, as shown in FIG. 6. When the low level signal $i_1$ from the flip-flop 204 is applied to a transistor 9c of the ignitor 9a, the transistor 9c is turned off to cause conduction of a transistor 9e. Then, a low level signal appears from the transistor 9e and energizes the ignition coil 9 at the dwell angle $K_2°$. When the flip-flop 204 receives at its input terminal S the output signal h from the counter 109, it generates at its output terminal $\overline{Q}$ a high level signal $i_2$ which is applied to the transistor 9c as an ignition timing signal. Then, the transistor 9c is turned on to cause non-conduction of the transistor 9e. Thus, a high level signal appears from the transistor 9e and deenergizes the ignition coil 9 at its leading edge.

Hereinafter, the operation of the ignition control apparatus 8 will be described in detail under various operating conditions of the engine E. Under cranking of the engine E, assuming that a reference signal a from the signal generator 10 is applied to AND gate 21 and the decade counter 32 and that angular signals b from the signal generator 10 are applied to the down counters 109 and 203, AND gate 21 receives clock pulses from the clock circuit 31 in response to the reference signal a to generate output pulses therefrom. Then, the output pulses from AND gate 21 are applied to the binary counter 22. Simultaneously, the counter 32 is reset by the reference signal a to count clock pulses from the clock circuit 31 and sequentially generates therefrom latch and reset signals c and d. The latch signal c is applied to the latch circuits 23 and 46, while the reset signal d is applied to the binary counter 22 and the down counters 109 and 203. Then, a binary signal, which is previously produced in the counter 22 in response to a reset signal d prior to the latch signal c, is latched and transferred by the latch circuit 23 to ROMs 101 and 102 in response to the latch signal c. When instant values of $\alpha$ and $\beta$ are respectively read out by ROMs 101 and 102 in relation to an instant rotation speed N defined by the binary signal from the latch circuit 23, binary signals indicating the values of $\alpha$ and $\beta$ are respectively applied to the subtractor 103 and the adder 105.

Meanwhile, an electric signal from the air flow meter 2 is amplified by the amplifier 44 and converted by the converter 45 into a binary signal indicative of an amount Ga of air intake. Then, the binary signal from the converter 45 is latched and transferred by the latch circuit 46 to the subtractor 103 in response to the latch signal c. When the subtractor 103 receives the binary signals from ROM 101 and the latch circuit 46 as described above, the value of $\alpha$ is subtracted by the subtractor 103 from the amount Ga of air intake and, thereafter, a binary signal indicative of a subtracted resultant value $(Ga-\alpha)$ is applied to ROM 104. When a value of spark advance angle is read out by ROM 104 in relation to the subtracted resultant value $(Ga-\alpha)$, a binary signal indicative of the read out value from ROM 104 is applied to the adder 105. In the adder 105, the read out value from ROM 104 is added to the value of $\beta$ defined by the binary signal from ROM 102 and, in turn, an added value is applied to the discriminator 106 as a binary signal indicative of an optimum spark advance angle $\theta$. In this instance, it should be noted that an instant amount of air intake may not properly be indicated by the binary signal from the latch circuit 46 because of cranking of the engine E. Thus, the discriminator 106 applies a binary electric signal indicative of the first predetermined spark advance angle $\theta_1°$ to the subtractor 108 under closings of the crank switch and the first throttle switch 12. Then, the first spark advance angle $\theta_1°$ is subtracted in the subtractor 108 from a constant $K_1°$ defined by a binary signal from the constant signal generator 107. Thereafter, a subtracted value $(K_1° - \theta_1°)$ as applied as a binary signal to the down counter 109 and the subtractor 202.

After the subtracted value $(K_1° - \theta_1°)$ is subtracted from the predetermined dwell angle $k_2°$ defined by a binary signal from the dwell angle signal generator 201, a binary signal indicative of a subtracted value $(K_1° - \theta_1° - K_2°)$ is applied by the subtractor 202 to the down counter 203. When the down counter 203 is reset by the above-noted reset signal d from the counter 32, a predetermined number of the angular signals b corresponding with the value $(K_1° - \theta_1° - K_2°)$ are counted down to zero by the counter 203. As a result, an output signal g appears from the counter 203 and is applied to the terminal R of the flip-flop 204. When the flip-flop 204 generates a low level signal $i_1$ therefrom in response to the output signal g, the low level signal $i_1$ is applied to the ignitor 9a to energize the ignition coil 9 at the dwell angle $K_2°$.

Meanwhile, when the down counter 109 is reset by the above-noted reset signal d from the counter 32, a predetermined number of the angular signals b corresponding with the subtracted value $(K_1° - \theta_1°)$ are counted down to zero by the counter 109. Then, an output signal h appears from the down counter 109 and is applied to the terminal S of the flip-flop 204. When the flip-flop 204 generates a high level signal $i_2$ therefrom in response to the output signal h, the high level signal $i_2$ is applied to the ignitor 9a to deenergize the ignition coil 9. Thus, the ignition coil 9 generates a spark voltage therefrom in response to deenergization thereof.

In summary, during cranking of the engine E, it will be understood that the ignition control apparatus 8 produces an ignition timing signal in response to a reset signal d at each half crankshaft rotation by using the first predetermined spark advance angle $\theta_1°$ from the discriminator 106.

Under idling operation of the engine E after the cranking, the crank switch is opened and the first throttle switch 12 is still closed. Thus, the discriminator 106 applies a binary electric signal indicative of the second predetermined spark advance angle $\theta_2°$ to the subtractor 108. With the subtractor 108, the second spark advance angle $\theta_2°$ is subtracted from a constant $K_1°$ defined by a binary signal from the constant signal generator 107 and, thereafter, a subtracted value $(K_1° - \theta_2°)$ is applied as a binary signal to the down counter 109 and the subtractor 202.

After the value $(K_1° - \theta_2°)$ is subtracted in the subtractor 202 from the predetermined dwell angle $K_2°$ defined by a binary signal from the dwell angle signal generator 201, a binary signal indicative of a subtracted value $(K_1° - \theta_2° - K_2°)$ is applied by the subtractor 202 to the down counter 203. When the down counter 203 is reset by a reset signal d from the counter 32, as previously described, a predetermined number of angular signals b corresponding with the value $(K_1° - \theta_2° - K_2°)$ are counted down to zero by the counter 203. Then, an output signal g appears from the counter 203 and is applied to the terminal R of the flip-flop 204. When the flip-flop 204 generates a low level signal $i_1$ in response to the output signal g, the low level signal $i_1$ is applied to the ignitor 9a to energize the ignition coil at the dwell angle $K_2°$.

Meanwhile, when the down counter 109 is reset by the reset signal d from the counter 32, a predetermined number of the angular signals b corresponding with the subtracted value ($K_1° - \theta_2°$) are counted down to zero by the counter 109. Then, an output signal h appears from the counter 109 and is applied to the terminal S of the flip-flop 204. When the flip-flop 204 generates a high level signal $i_2$ in response to the output signal h, the high level signal $i_2$ is applied as an ignition timing signal to the ignitor 9a to deenergize the ignition coil 9. Thus, the ignition coil 9 generates a spark voltage in response to deenergization thereof.

In summary, during idling of the engine E, it will be understood that the ignition control apparatus 8 produces an ignition timing signal in response to a reset signal d at each half crankshaft rotation by using the second predetermined spark advance angle $\theta_2°$ from the discriminator 106.

When the first throttle switch 12 and the crank switch are opened under travel of the vehicle, the discriminator 106 applies the binary signal indicative of the added resultant value $\theta°$ from the adder 105 to the subtractor 108. Then, the value $\theta°$ is substracted in the subtractor 108 from a constant $K_1°$ defined by a binary signal from the constant signal generator 107 and, thereafter, a subtracted value ($K_1° - \theta°$) is applied as a binary signal to the down counter 109 and the subtractor 202.

After the value ($K_1° - \theta°$) is subtracted in the subtractor 202 from the predetermined dwell angle $K_2°$, a binary signal indicative of a subtracted value ($K_1° - \theta° - K_2°$) is applied by the subtractor 202 to the down counter 203. When the counter 203 is reset by a reset signal d, as previously described, a predetermined number of angular signals b corresponding with the value ($K_1° - \theta° - K_2°$) are counted down to zero by the counter 203. Then, a low level signal $i_1$ appears from the flip-flop 204 in response to an output signal g issued from the counter 203 and is applied to the ignitor 9a to energize the ignition coil 9 at the dwell angle $K_2°$.

Meanwhile, when the down counter 109 is reset by the reset signal d, a predetermined number of the angular signals b corresponding with the subtracted value ($K_1° - \theta°$) are counted down to zero by the counter 109. Then, an output signal h appears from the counter 109 and is applied to the terminal S of the flip-flop 204. When the flip-flop 204 generates a high level signal $i_2$ in response to the output signal h, the high level signal $i_2$ is applied as an ignition timing signal to the ignitor 9a to deenergize the ignition coil 9.

In summary, during travel of the vehicle, it will be understood that the ignition control apparatus 8 produces an ignition timing signal in response to a reset signal d at each half crankshaft rotation by using the added resultant value $\theta°$ from the discriminator 106.

Figure 7:
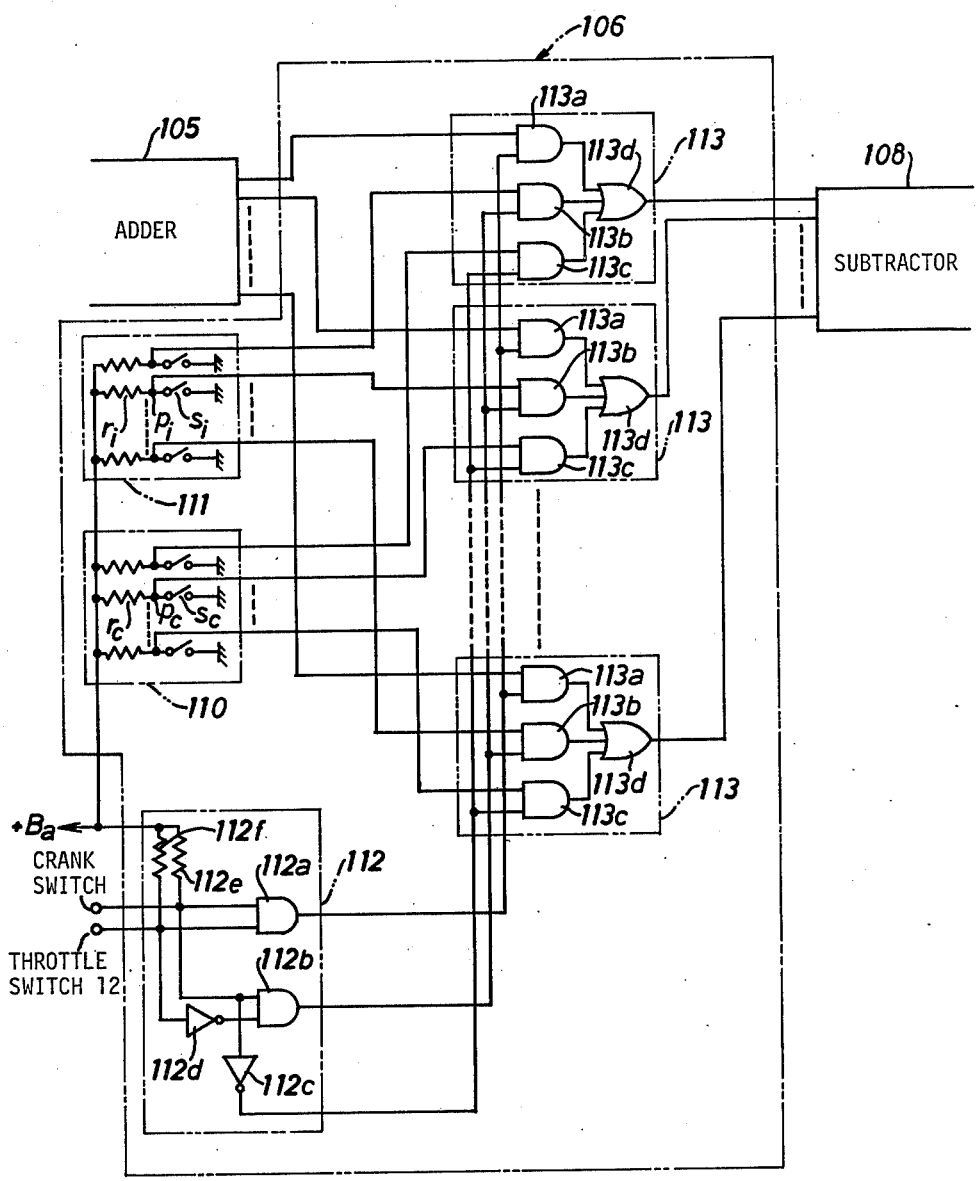
FIG. 7 is a circuit diagram of an embodiment of the spark advance angle discriminator illustrated in block form in FIG. 4.

In FIG. 7, there is illustrated an embodiment of the discriminator 106 which comprises a plurality of selector circuits 113 for selecting one of binary signals from the adder 105 and first and second spark advance angle signal generators 110 and 111 in response to binary signals from a logic circuit 112. The logic circuit 112 includes an AND gate 112a for generating a low level signal therefrom when at least one of the crank switch and the first throttle switch 12 is closed. Input terminals of AND gate 112a are respectively grounded through the crank switch and the first throttle switch 12 and also connected to a battery Ba respectively through resistors 112e and 112f. When the crank switch and the throttle switch 12 are opened, AND gate 112a receives an electric voltage from the battery Ba through the resistors 112e and 112f to generate a high level signal therefrom.

The logic circuit 112 further includes an AND gate 112b for generating a low level signal therefrom when the crank switch and the throttle switch 12 are opened. When the crank switch is closed under opening the throttle switch 12, AND gate 112b also generates a low level signal therefrom due to function of an inverter 112d. When the crank switch is opened and the throttle switch 12 is closed, the voltage from the battery Ba is applied to the first input terminal of AND gate 112b through the resistor 112e. Simultaneously, the inverter 112d is grounded at its input terminal to generate a high level signal which is applied to the second input terminal of AND gate 112b. Then, AND gate 112b generates a high level signal therefrom. An inverter 112c is provided to generate a low level signal when the crank switch is opened. When the crank switch is closed, the inverter 112c generates a high level signal therefrom.

The first spark advance angle signal generator 110 comprises a plurality of series circuits respectively composed of a switch $S_c$ and a resistor $r_c$. These series circuits are connected in parallel to each other between the battery $B_a$ and the ground. Each series circuit receives the electric voltage from the battery $B_a$ under opening the switch $S_c$ to generate a high level signal at a junction $P_c$. When each switch $S_c$ is closed, each series circuit is grounded to generate a low level signal at the junction $P_c$. In the generator 110, a first predetermined optimum spark advance angle $\theta_1°$ necessary for cranking operation of the engine E is previously set by opening and closing each switch $S_c$.

The second spark advance angle signal generator 111 comprises a plurality of series circuits respectively composed of a switch $S_i$ and a resistor $r_i$. These series circuits are connected in parallel to each other between the battery $B_a$ and the ground. Each series circuit receives the electric voltage from the battery $B_a$ under opening the switch $S_i$ to generate a high level signal at a junction $P_i$. When each switch $S_c$ is closed, each series circuit is grounded to generate a low level signal at the junction $P_i$. In the generator 111, a second optimum spark advance angle $\theta_2°$ necessary for idle operation of the engine E is previously set by opening and closing each switch $S_i$.

Each selector circuit 113 comprises three AND gates 113a to 113c and an OR gate 113d. Each AND gate 113a transfers the binary signal from the adder 105 to the subtractor 108 through each OR gate 113d only when AND gate 113a generates the high level signal. Only when AND gate 112b generates the high level signal, each AND gate 113b applies the high or low level signal from each series circuit of the signal generator 111 to the subtractor 108 through each OR gate 113d as a binary signal indicative of the second predetermined spark advance angle $\theta_2°$. Further, each AND gate 113c applies the high or low level signal from each series circuit of the signal generator 110 to the subtractor 108 through each OR gate 113d as a binary signal indicative of the first predetermined spark advance angle $\theta_1°$ only when the inverter 112c generates the high level signal.

In operation of the discriminator 106, when the crank switch and the first throttle switch 12 are opened, a high level signal appears from AND gate 112a and low level signals appear from AND gate 112b and the inverter 112c respectively. Then, the binary signal from the adder 105 is transferred by each AND gate 113a to each OR gate 113d in response to the high level signal from AND gate 112a and, in turn, transferred by each OR gate 113d to the subtractor 108. In this state, the binary signals from the signal generators 110 and 111 are blocked by each AND gate 113b and 113c in response to the low level signals from AND gate 112b and the inverter 112c.

When the crank switch and the throttle switch 12 are closed, low level signals appear from AND gates 112a and 112b and a high level signal appears from the inverter 112c. Then, only the binary signal from the signal generator 110 is applied by each AND gate 113c to each OR gate 113d in response to the high level signal from the inverter 112c and, in turn, applied to the subtractor 108.

When the crank switch is opened under closing the throttle switch 12, low level signals appear from AND gate 112a and the inverter 112c and a high level signal appears from AND gate 112b. Then, only the binary signal from the signal generator 111 is applied by each AND gate 113b to each OR gate 113d in response to the high level signal from AND gate 112b and, in turn, applied by each OR gate 113d to the subtractor 108.

In the above embodiment, if it is not necessary to consider engine detonation, ROM 102 and the adder 105 may be eliminated. In this case, ROM 104 previously stores therein a data defined, for example, by the straight line $A_9$ in replacement of the first reference data defined by the polygonal line C, the straight line $A_9$ indicating an optimum spark advance angle in relation to an amount of the sucked air at 4400 r.p.m. in FIG. 1, and the subtractor 103 is replaced with an adder.

In FIG. 9, there is a modified portion of the first calculation circuit 100 in which read only memories or ROMs 101a and 102a are provided to receive the binary signal indicative of an instant amount Ga of air intake from the conversion circuit 40. ROM 101a previously stores therein a data indicating a parameter Y in relation to the amount Ga of air intake in (b) of FIG. 8, the parameter Y indicating an interval along the axis of abscissas between polygonal lines F and $F_i$ ($i = 1, 2, \ldots$) in (a) of FIG. 8. ROM 102a previously stores therein another data indicating a parameter $\delta$ in relation to the amount Ga of air intake in (c) of FIG. 8, the parameter $\delta$ indicating a value to be compensated along the axis of ordinates between the polygonal lines F and $F_i$ ($i = 1, 2, \ldots$) in (a) of FIG. 8. In (a) of FIG. 8, the spark advance angle $\theta°$ is plotted in relation to the rotation speed N in consideration with an amount of air intake by utilizing the characteristic curves of FIG. 1. With ROM 101a, an instant value of Y is read out as a binary signal in relation to the amount Ga of air intake defined by the binary signal from the conversion circuit 40 by using the stored data. Meanwhile, with ROM 102a, an instant value of $\delta$ is read out as a binary signal in relation to the amount Ga of air intake by using another stored data.

The subtractor 103 is provided to receive the binary signal indicative of the value of Y from ROM 101a and the binary signal indicative of the rotation speed N from the speed calculation circuit 20. With the subtractor 103, the value of Y is subtracted from the rotation speed N, and a subtracted value (N−Y) is applied as a binary signal to a read only memory or ROM 104a. ROM 104a previously stores therein a second reference data defined by the polygonal line E which indicates an optimum spark advance angle in relation to rotation speed at a predetermined amount of the sucked air in (a) of FIG. 8. With ROM 104a, a value or spark advance angle is read out in relation to the subtracted value (N−Y) defined by the binary signal from the subtractor 103, and a read out value from ROM 104a is applied as a binary signal to the adder 105. The adder 105 adds the read out value from ROM 104a to the value of $\delta$ defined by the binary signal from ROM 102a. An added resultant value is applied to the advance angle discriminator 106 as a binary signal indicative of an optimum spark advance angle $\theta°$.

Figure 10:
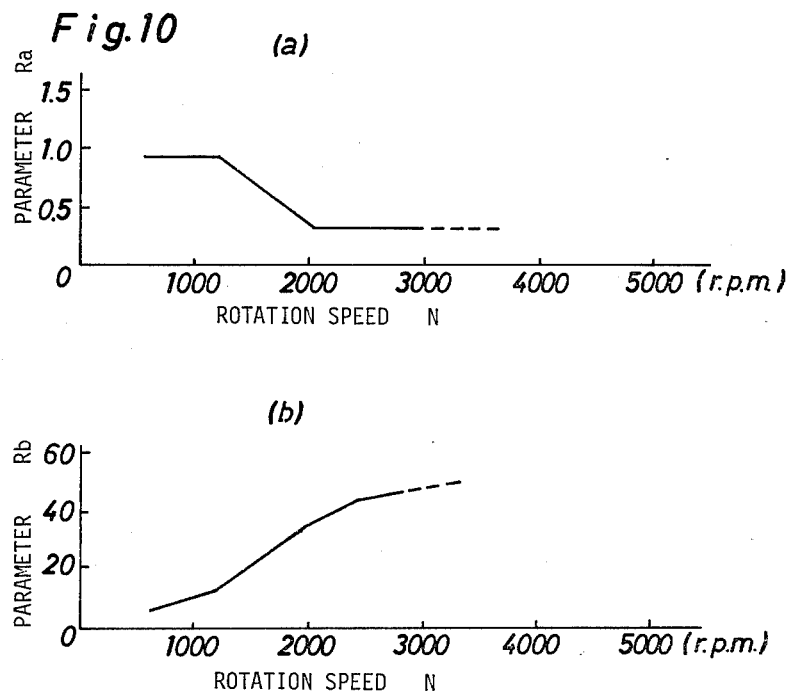
FIG. 10 depicts graphs respectively indicative of parameters Ra and Rb in relation to rotation speed N.
Figure 11:
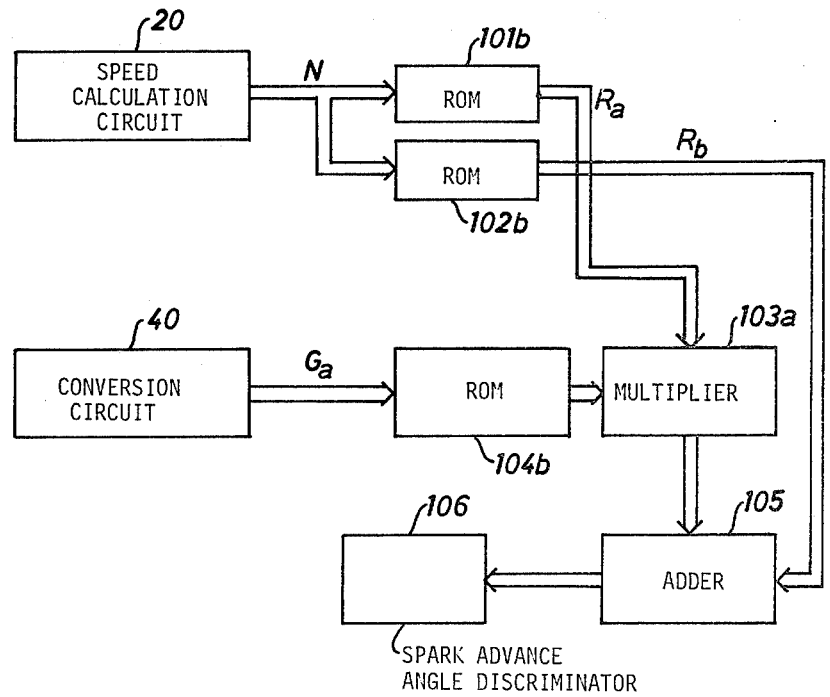
FIG. 11 illustrates another modified portion of the circuit diagram of the ignition control apparatus shown in FIG. 4.

FIG. 11 illustrates another modified portion of the first calculation circuit 100 in which read only memories or ROMs 101b and 102b are provided to receive the binary signal indicative of an instant rotation speed N from the speed calculation circuit 20. ROM 101b previously stores therein a data indicating a parameter Ra in relation to the rotation speed N in (a) of FIG. 10, the parameter Ra indicating a ratio between the ascent of the straight line A and the ascent of the straight line $A_i$ ($i = 1, 2, \ldots$) in FIG. 1. ROM 102b previously stores therein a data indicating a parameter Rb in relation to the rotation speed N in (b) of FIG. 10, the parameter Rb indicating a value to be compensated along the axis of ordinates between the straight lines A and $A_i$ ($i = 1, 2, \ldots$) in FIG. 1. With ROM 101b, an instant value of Ra is read out as a binary signal in relation to the instant rotation speed N defined by the binary signal from the speed calculation circuit 20 and a read out value Ra is applied as a binary signal to a multiplier 103a. Meanwhile, with ROM 102b, an instant value of Rb is read out as a binary signal in relation to the instant rotation speed N and a read out value Rb is applied as a binary signal to the adder 105.

A read only memory or ROM 104b is provided to receive the binary signal indicative of an instant amount Ga of the sucked air from the conversion circuit 40. ROM 104b previously stores therein a third reference data indicating an optimum spark advance angle in relation to an amount of the sucked air at a predetermined rotation speed of 8000 r.p.m., the third reference data being defined by the straight line A in FIG. 1. With ROM 104b, a value or spark advance angle is read out in relation to an instant amount of the sucked air defined by the binary signal from the conversion circuit 40, and a read out value from ROM 104b is applied as a binary signal to the multiplier 103a. In the multiplier 103a, the read out value defined by the binary signal from ROM 104a is multiplied by the instant value Ra defined by the binary signal from ROM 101b, and a multiplied resultant value is applied as a binary signal to the adder 105. The adder 105 adds the multiplied resultant value from the multiplier 103a to the instant value of Rb defined by the binary signal from ROM 102b, and an added value is applied to the discriminator 106 as a binary signal indicative of an optimum spark advance angle $\theta°$.

In this modification, in case ROM 104b previously stores therein the data defined by the straight line $A_9$ in replacement of the third reference data defined by the straight line A, the adder 105 should be replaced with a subtractor. Furthermore, assuming that each straight line except for the straight line $A_9$ is approximately in parallel with the straight line $A_9$ in FIG. 1, ROM 101b and the multiplier 103a may be eliminated.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An electronic ignition control apparatus for an internal combustion engine having an output shaft rotated by a piston, an ignition coil adapted to generate a spark voltage upon deenergization of the primary winding thereof, and a spark plug activated by the spark voltage to ignite the air-fuel mixture metered into a combustion chamber of said engine so as to operate said piston, the control apparatus comprising:

- a first signal generator for producing a first binary signal indicative of rotation speed N of said output shaft;
- a second signal generator for producing a second binary signal indicative of an amount Ga of air intake of the combustion chamber of said engine;
- first memory means for storing a parameter $\alpha$ for each incremental value of rotation speed N of said output shaft to produce a third binary signal indicative of a value of said parameter $\alpha$ corresponding to said first binary signal, said parameter $\alpha$ representing a difference between the amount Ga of air intake at the actual engine rotation speed required for any particular optimal spark advance angle, and an amount of air intake at a predetermined engine rotation speed required for the same optimal spark advance angle $(Ga \mp \alpha)$;
- a calculation circuit for calculating a value $Ga \mp \alpha$ from values respectively defined by the second and third binary signals and for producing a fourth binary signal indicative of the calculated value;
- second memory means for storing the optimum spark advance angle $\theta$ satisfying a first linear equation $\theta = f(Ga \mp \alpha)$ and for producing a fifth binary signal indicative of the optimum spark advance angle $\theta$ in accordance with the fourth binary signal;
- a timing signal generator for generating a timing signal in accordance with the fifth binary signal; and
- means for deenergizing the primary winding of said ignition coil in response to the timing signal.

2. An electronic ignition control apparatus as claimed in claim 1, wherein said calculation circuit includes a subtractor for subtracting a value of the third binary signal from a value of the second binary signal to produce the fourth binary signal.

3. An electronic ignition control apparatus for an internal combustion engine having an output shaft rotated by a piston, an ignition coil adapted to generate a spark voltage upon deenergization of the primary winding thereof, and a spark plug activated by the spark voltage to ignite the air-fuel mixture metered into a combustion chamber of said engine so as to operate said piston, the control apparatus comprising:

- a first signal generator for producing a first binary signal indicative of rotation speed N of said output shaft;
- a second signal generator for producing a second binary signal indicative of an amount Ga of air intake of the combustion chamber of said engine;
- first memory means for storing a parameter Y for each incremental value of the amount of air intake Ga to produce a third binary signal indicative of a value of said parameter Y in accordance with the second binary signal, said parameter Y representing a difference between the rotation speed N of said output shaft at the actual amount of air intake required for any particular optimal spark advance, and a rotational speed at a predetermined air intake amount required for the same optimal spark advance angle $(N \mp Y)$;
- a calculation circuit for calculating a value $N \mp Y$ from values respectively defined by the first and third binary signals and for producing a fourth binary signal indicative of the calculated value;
- second memory means for storing second data indicating the optimum spark advance angle $\theta$ for incremental values of $N \mp Y$, and satisfying a linear equation $\theta = f(N \mp Y)$ and for producing a fifth binary signal indicative of the optimum spark advance angle $\theta$ in accordance with the fourth binary signal;
- a timing signal generator for generating a timing signal in accordance with the fifth binary signal; and
- means for deenergizing the primary winding of said ignition coil in response to the timing signal.

4. An electronic ignition control apparatus as claimed in claim 3, wherein said calculation circuit includes a subtractor for subtracting a value of the third binary signal from a value of the first binary signal to produce the fourth binary signal.

5. An electronic ignition control apparatus for an internal combustion engine having an output shaft rotated by a piston, an ignition coil adapted to generate a spark voltage upon deenergization of the primary winding thereof, and a spark plug activated by the spark voltage to ignite the air-fuel mixture metered into a combustion chamber of said engine so as to operate said piston, the control apparatus comprising:

- a first signal generator for producing a first binary signal indicative of rotation speed N of said output shaft;
- a second signal generator for producing a second binary signal indicative of an amount Ga of air intake of the combustion chamber of said engine;
- first memory means for storing a parameter Rb for each incremental value of speed N of said output shaft to produce a third binary signal indicative of a value of said parameter Rb in accordance with the first binary signal, said parameter Rb representing a difference between the optimal spark advance angle $\theta$ at the actual engine rotation speed and any particular air intake amount, and an optimal spark advance angle at a predetermined engine rotation speed and the same air intake amount $(\theta \mp Rb)$;
- second memory means for storing the optimum spark advance angle $\theta \mp Rb$ for incremental values of Ga, and satisfying a first linear equation $\theta \mp Rb = f(Ga)$ and for producing a fourth binary signal indicative of a spark advance angle $\theta \mp Rb$ in accordance with the second binary signal;
- a calculation circuit for calculating a value $\theta$ from values defined by the third and fourth binary signals to produce a fifth binary signal indicative of the calculated value $\theta$;
- a timing signal generator for generating a timing signal in accordance with the fifth binary signal; and
- means for deenergizing the primary winding of said ignition coil in response to the timing signal.

6. An electronic ignition control apparatus as claimed in claim 5 wherein:

said apparatus further comprises third memory means for storing a second parameter Ra in relation to rotation speed N of said output shaft to produce a sixth binary signal indicative of a value of said second parameter Ra in accordance with the first binary signal, said second parameter Ra indicating a ratio between a first slope of said first linear equation $\theta \mp Rb = f(Ga)$ and a second slope of a second linear equation $\theta = f(Ga)$; and said calculation circuit comprises a multiplier for multiplying a value of the fourth binary signal by a value of the sixth binary signal to produce a multiplied value, and an adder for adding a value of the third binary signal to said multiplied value to produce the fifth binary signal.

7. An electronic ignition control apparatus as claimed in claim 5, wherein said calculation circuit includes an adder for adding a value of the third binary signal to a value of the fourth binary signal to produce the fifth binary signal.

* * * * *